(12) United States Patent
Potente

(10) Patent No.: US 6,305,321 B1
(45) Date of Patent: Oct. 23, 2001

(54) SELECTIVE SEED PORT

(76) Inventor: John E Potente, 659 Wheeler Rd., Hauppauge, NY (US) 11788

( * ) Notice: Subject to any disclaimer, the term of this patent is extended or adjusted under 35 U.S.C. 154(b) by 0 days.

(21) Appl. No.: 09/510,989

(22) Filed: Feb. 22, 2000

(51) Int. Cl.⁷ .................................................. A01K 61/02
(52) U.S. Cl. .......................................... 119/52.4; 119/52.2
(58) Field of Search ................... 119/52.2, 52.3, 119/52.4, 53.3, 57.8, 57.9

(56) References Cited

U.S. PATENT DOCUMENTS

| | | | |
|---|---|---|---|
| 2,944,516 | * 7/1960 | Malloy, Sr. ......................... | 119/52.2 |
| 3,244,150 | * 4/1966 | Blair .................................... | 119/52.2 |
| 4,389,975 | * 6/1983 | Fisher, Jr. ........................... | 119/52.3 |
| 4,632,061 | * 12/1986 | Tucker et al. ....................... | 119/57.8 |
| 5,927,231 | * 7/1999 | Bloedorn ............................ | 119/52.2 |
| 5,975,015 | * 11/1999 | Runyon et al. ...................... | 119/52.2 |

* cited by examiner

*Primary Examiner*—Charles T. Jordan
*Assistant Examiner*—Elizabeth Show
(74) *Attorney, Agent, or Firm*—Alfred M. Walker

(57) ABSTRACT

The invention comprises a feeding port for a bird feeder that serves to discriminate between prospective feeding birds by virtue of a forward leaning facing and a downward sloping shortened perch. The prospective bird must have the ability to cling to the short angled perch while leaning backwards to obtain feed from the seed access opening.

14 Claims, 2 Drawing Sheets

SELECTIVE SEED PORT

BACKGROUND OF THE INVENTION

1. Field of the Invention

The recent past has seen a widespread interest in feeding backyard birds. Accompanying this activity has been the construction and engagement of bird feeders that dispense seeds as feed for these wild birds. Certain species of these birds, notably the introduced house sparrow, the introduced European Starling, and the transported house finch, tend to dominate such feeders. Not only do they overpower and outnumber the native birds, but they also have voracious appetites, consuming large quantities of seed. This requires numerous trips to fill the feeder and, likewise, a large feeder compartment to accommodate a large volume of seed. This invention relates to a device design that restricts the use of the feeder to the overpopulated house sparrows and starlings and allows access to the native birds that have an ability to cling.

2. Description of the Prior Art

While the need to provide a feeder that is more favorable to native birds exists, either insufficient attention has been devoted to the subject or prior efforts have proven inadequate. U.S. Pat. No. 3,022,768 by Lynch demonstrates a feeder having a wall formed with a plurality of "upwardly extending slots which are not wide enough to permit feed to drop" from the hopper by gravity, "but are wide enough to permit the feed to be picked through the slots by birds of the 'clinging' type such as chickadees, woodpeckers, resting on portions of the wall between the slots which portions thus function as support elements for such birds". This feature foils birds such as English sparrows that cannot cling.

While the concept presented by Lynch is noteworthy, it has certain inherent misgivings. Once a chickadee or woodpecker has gained a foothold on a surface and has made its initial clinging retention, it is then easy for it to negotiate around awkward positions. But it first must be able to sense that it has a reasonable chance of gaining a foothold from a flying approach. While the portions between the slots may suffice for retention, it is an awkward maneuver to initially attain, even for the clinging birds, especially since they must make an aerial landing and grasp a small slit on a flush surface in order to utilize it. This is a difficult and discouraging arrangement and is further complicated by the fact that there is food within or protruding from the very slots they must quickly grip to acquire a secure attachment. The arrangement proposed by Lynch also brings the bird's foot into contact with the feed allowing the transfer of bacteria to the food source.

U.S. Pat. No. 4,318,364 by Besherer demonstrates curved shaped channels that act to dispense food universally to any bird. There is no device or intent to discriminate between the assortment of wild birds. The device merely acts to act as a conduit to release the seed from the container compartment to an exposed feeding area.

U.S. Pat. No. 4,706,851 by Hegedus demonstrates a device that, likewise, is simply another apparatus that invites and accommodates any and all birds to partake of the available seed from long perches adjacent to the dispensing apertures.

U.S. Pat. No. 4,996,947 by Petrides is a clever and effective method that requires a bit of acrobatics from its participants. The concept and design requires that a bird, such as the adaptable goldfinch or pine siskin easily land on a comfortable perch and then swing upside down to reach an opening in the feeder that is directly below the perch. While this technique excludes the house sparrow and house finch that are not as gymnastic, it is based upon entirely different principles and design.

OBJECTS OF THE INVENTION

It is an object of this invention to provide a structural arrangement within a bird feeder that limits the food accessibility of certain birds. It is a further object of this invention to permit access to the angled feeding port only to those birds capable of clinging to a reduced ledge.

BRIEF SUMMARY OF THE INVENTION

In keeping with the objects of others which may become apparent, the present invention includes a bird feeder that has a perching ledge that is shortened and placed very near to the dispensing port of the feeder. The facing of the feeder that contains the dispensing port is angled forward toward the perch.

BRIEF DESCRIPTION OF THE DRAWINGS

In conjunction with the detailed description, reference is made to the drawings wherein.

DETAILED DESCRIPTION OFF THE DRAWINGS

Figure 1:
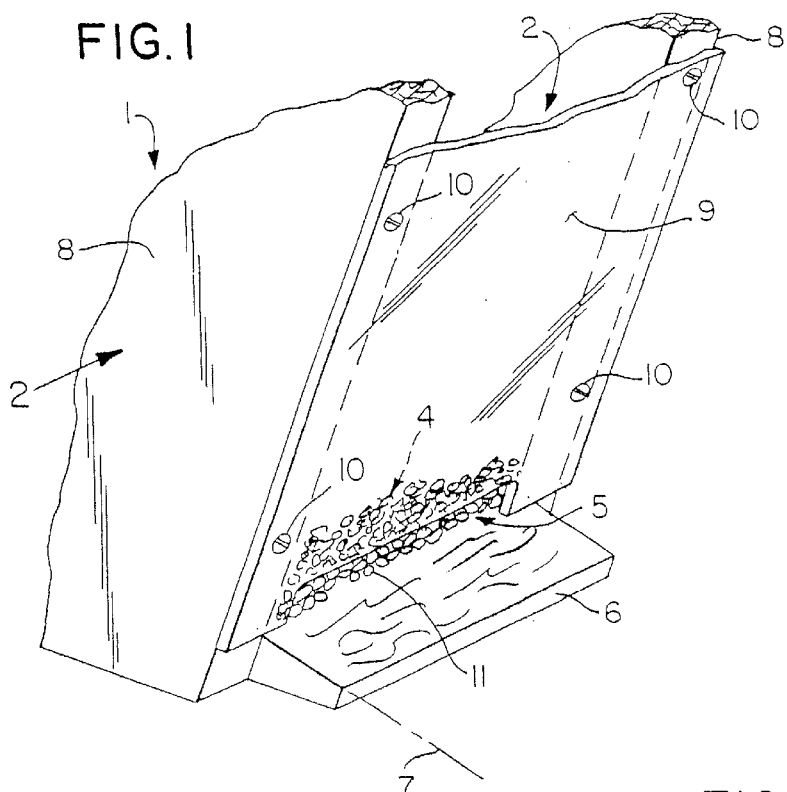
FIG. 1 is a perspective view of the instant invention.

This device 1 as depicted in FIG. 1 comprises a face 9, sides 8, and an extended floor ledge 6 which act to enclose a hollow space 2 that is open at the lower end 5. The face 9 is attached to the sides 8.

Figure 5:
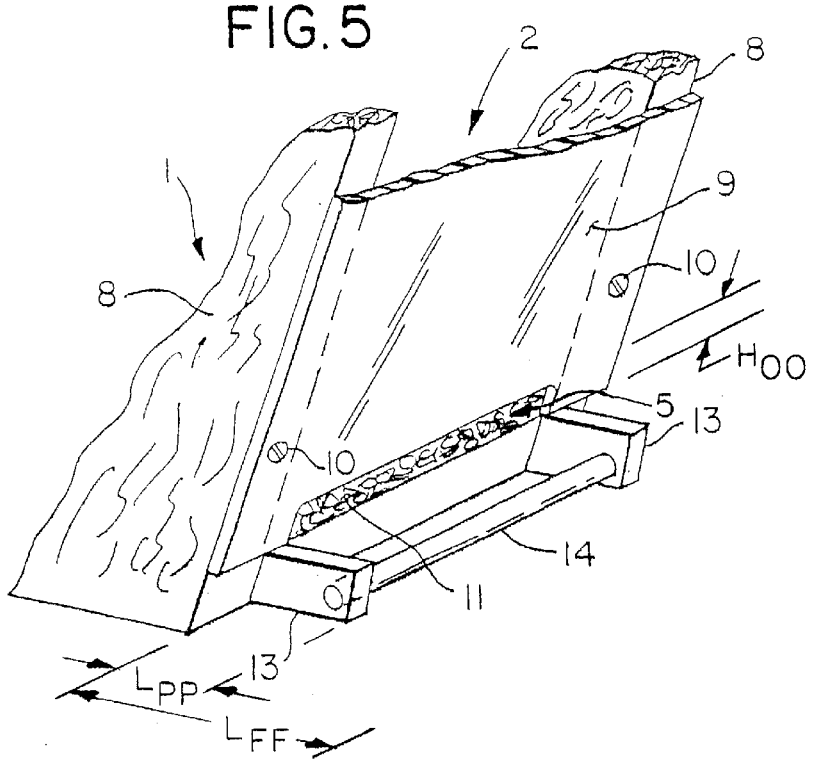
FIG. 5 is a perspective view of a third embodiment of the present invention.

The face 9 has a horizontal area on its lower end 5 that is set away from the extended floor ledge 6 creating a narrow open space. This narrow opening 11 of less than a quarter inch serves as the access port whereby birds may obtain seed. The floor 6 extends out less than an inch past the face 4 of the feeder to serve as a short perching ledge 6. The ledge 6 is too short to allow a bird to alight and rest with its feet comfortably flatly extended. It is positioned at a short distance extending less than one inch from the face of the feeder. This will prevent any of the larger birds such as crows and starlings from landing or resting on it. With the ledge 6 pitched downward at an angle 7 the smaller unwanted birds such as house sparrows and house finch will be discouraged from perching. This may also be accomplished with a short ledge 14 that is set apart from the feeder floor itself as shown in FIG. 5. Only those birds that can grip the short ledge 6 and can cling on at an awkward angle while leaning backwards will be able to acquire the seed 4. Since the floor 6 of the feeder is pitched downward the lower opening 11 must be very narrow being less than a quarter inch in width (unlike any other hopper-type feeder) to prevent the seed 4 from spilling out. The opening 5 is just wide enough for the seed 4 to protrude slightly so that the birds such as chickadees can pick it free.

Figure 2:
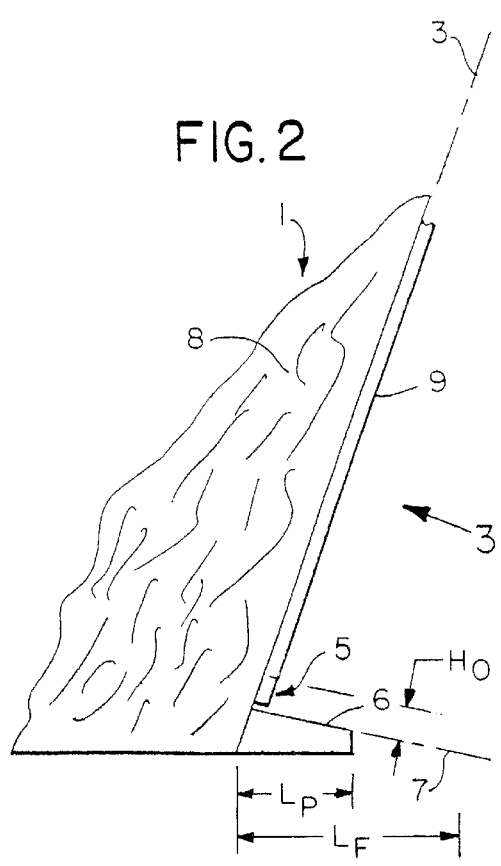
FIG. 2 is a partial side elevation view taken in the direction of arrow 2 of FIG. 1.
Figure 3:
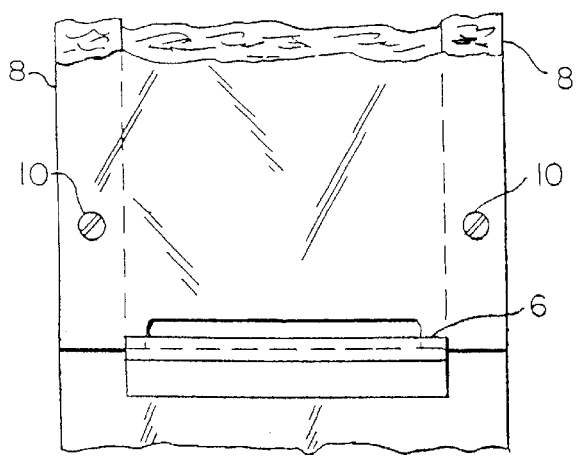
FIG. 3 is a partial front elevational view taken in the direction of arrow 3 of FIG. 2.
Figure 4:
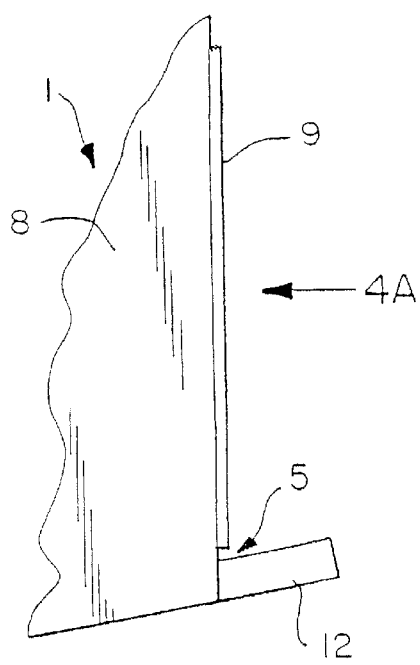
FIG. 4 is a partial side elevational view of another embodiment.
Figure 4A:
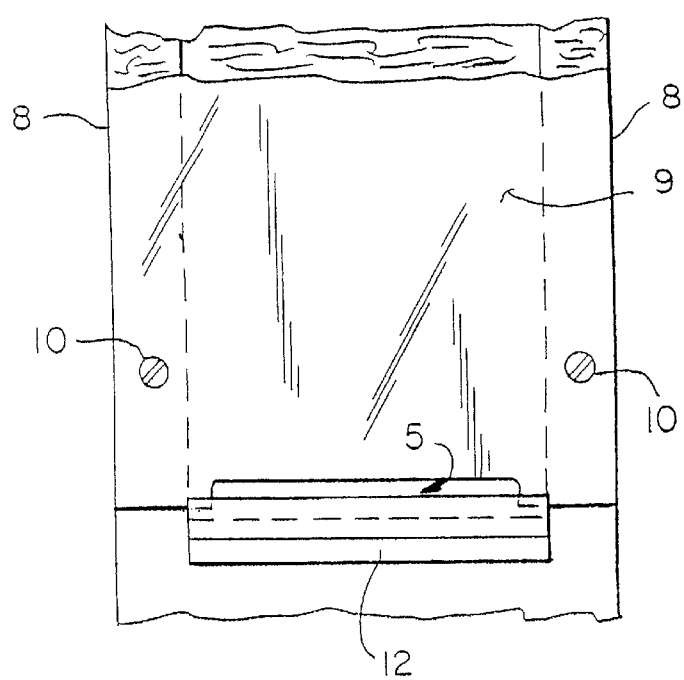
FIG. 4A is a partial front elevational view taken in the direction of arrow 4A of FIG. 4.

The face 9 is titled forward at any angle 3; as shown in FIG. 2; to further encroach upon the perching position of the birds that cannot cling. The face 9 is of sufficient clarity so that the seed 4 is visible to the birds in search of food. While the angled facing 9 is the preferable orientation, the facing 9 may be oriented upright vertically as in FIG. 4. The short ledge 12 may be without a declining angle; as shown in FIG. 4.

FIG. 2 shows that perch 6 extends outward from a bottom edge of facing 9 a predetermined distance $L_p$.

However tilted facing 9 extends horizontally outward a further predetermined distance $L_f$, such that $L_f$ exceeds $L_p$ by at least twice the length of $L_p$.

In that manner, there is no substantial vertical clearance provided for a bird trying to perch upon perch 6. The over-hang caused by the substantial horizontal length of tapered facing a provides a barrier to discourage any birds incapable of grasping perch 6 with their claws.

Furthermore, length $L_p$ of perch 6 is no more than three times the height $H_o$ of longitudinally extending opening 11, thereby further preventing a non-grasping bird from standing upon perch 6. As noted previously, since height $H_o$ of opening 11 is no more than one quarter inch, length $L_p$ of perch 6 does not exceed ¾ inch.

The same is true in FIG. 5 respect to the perch formed by ledge 14 and cantilevered bracket 13. In that case, $L_{pp}$, corresponding to perch 13, 14 has a length such that length $L_{ff}$ of tapered facing 9 exceeds $L_{pp}$ by at least twice that of $L_{pp}$.

I claim:

1. A combination feeding port and perch on a hollow, hopper style feed storing bird feeder structure which allows access of seed only to those birds able to pick seed through a small horizontal open slot port while clinging to a perch, while denying access to other non-clinging birds, comprising:

said structure having an extended floor, a facing and side enclosing a hollow space;

a facing attached to said open port;

said facing having an upper end and a lower end;

said facing being tilted forward;

said facing having a lower narrow horizontal slotted opening wide enough to allow seed to be plucked through, yet not wide enough to allow seed to fall freely through;

a perch extending out past said lower end of said facing, said perch being short;

said perch having a height limited to a predetermined open grasping height of the claws of a clinging bird;

said perch being angled downward;

said tilted facing extending horizontally outward a predetermined length of being at least twice that of a predetermined length by which said perch extends horizontally, and, said predetermined extended length of said perch further being no more than three times that of predetermined height of horizontal slotted opening.

2. A feeding port and perch, as in claim 1, wherein said facing and said sides are integrally provided in one continuous structure.

3. The feeding port and perch as in claim 1 wherein said facing, sides and extended floor are integrally provided as one structure.

4. The feeding port and perch as in claim 1, wherein said facing and floor are integrally provided as one structure.

5. The feeding port and perch as in claim 1, wherein said perch is a component separate from said floor.

6. The feeding port and perch as in claim 1, wherein said slot opening, includes a width being variable as to the particular seed type being utilized in, and dispensed from, said bird feeder structure.

7. A combination feeding port and perch on a hollow, hopper-style feed storing bird feeder which allow access of seed only to those birds able to pick seed through a small horizontal open slot while clinging to a perch, while denying access to other non-clinging birds, comprising:

a facing attached to said open port;

said facing having an upper end and a lower end;

said facing being tilted forward;

said facing having a lower narrow horizontal slotted opening wide enough to allow seed to fall freely through;

said perch being short;

said perch having a height limited to a predetermined open grasping height of the claws of a clinging bird;

said tilted facing extending horizontally outward a predetermined length of being at least twice that of a predetermined length by which said perch extends horizontally, and, said predetermined extended length of said perch further being no more than three times that of predetermined height of said horizontal slotted open port.

8. The feeding port and perch, as in claim 7 wherein said facing and said sides are integrally provided as one continuous structure.

9. The feeding porch and perch as in claim 7 wherein said facing, sides and extended floor are provided integrally one structure.

10. The feeding porch and perch as in claim 8 wherein said facing and extended floor are provided integrally as one continuous structure.

11. The feeding porch and perch, as in claim 8, wherein said perch is a component separate from said floor.

12. The feeding porch and perch, as in claim 8 wherein said slot opening is variable in width as to the particular seed type being utilized and dispensed therefrom.

13. A combination feeding port and perch on a hollow, hopper-style feed storing bird feeder which allow access of seed only to those birds able to pick seed through a small horizontal open slot while clinging to a perch, while denying access to other non-clinging birds, comprising:

a facing attached to said open port;

said facing having an upper end and a lower end;

said facing having a lower narrow horizontal slotted opening wide enough to allow seed to fall freely through;

said perch being short;

said perch having a means for limiting access to said perch to only a claw-grasping bird; said means comprising said perch having a height corresponding to an open grasping height of the claws of a clinging bird and said perch having an outward extending length less than a predetermined length of a landing zone for a bird to stand erect upon.

14. The feeding port and perch as in claim 13 wherein said means for limiting access to said perch further comprising said facing being tilted forward a predetermined horizontal length, wherein said facing overhangs said perch at a predetermined height above said perch less than a predetermined height of a bird standing erect thereunder.

* * * * *